(12) United States Patent
Zou et al.

(10) Patent No.: US 12,531,687 B2
(45) Date of Patent: Jan. 20, 2026

(54) ALLOCATING CONFIGURATION GRANT RESOURCES ACROSS MULTIPLE BASE STATIONS

(71) Applicant: ZTE CORPORATION, Guangdong (CN)

(72) Inventors: Wei Zou, Shenzhen (CN); He Huang, Shenzhen (CN); Li Tian, Shenzhen (CN); Li Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 422 days.

(21) Appl. No.: 18/151,080

(22) Filed: Jan. 6, 2023

(65) Prior Publication Data

US 2023/0179361 A1 Jun. 8, 2023

Related U.S. Application Data

(63) Continuation of application No. PCT/CN2020/106565, filed on Aug. 3, 2020.

(51) Int. Cl.
| | |
|---|---|
| *H04L 5/00* | (2006.01) |
| *H04W 72/30* | (2023.01) |
| *H04W 76/11* | (2018.01) |
| *H04W 76/27* | (2018.01) |

(52) U.S. Cl.
CPC ........... *H04L 5/0048* (2013.01); *H04W 72/30* (2023.01); *H04W 76/11* (2018.02); *H04W 76/27* (2018.02)

(58) Field of Classification Search
CPC ..... H04L 5/0048; H04W 72/30; H04W 76/11; H04W 76/27; H04W 72/23
See application file for complete search history.

(56) References Cited

U.S. PATENT DOCUMENTS

| | | | | |
|---|---|---|---|---|
| 2020/0245189 | A1 | 7/2020 | Tang | |
| 2021/0315049 | A1* | 10/2021 | Wei | ............... H04W 76/27 |
| 2022/0015131 | A1* | 1/2022 | Cheng | ............... H04L 5/0055 |
| 2022/0086891 | A1* | 3/2022 | Baek | ............... H04W 72/23 |

(Continued)

FOREIGN PATENT DOCUMENTS

| | | |
|---|---|---|
| CN | 102158964 A | 8/2011 |
| CN | 103428723 A | 12/2013 |

(Continued)

OTHER PUBLICATIONS

3GPP TSG-RAN WG2 Meeting #109-e; R2-2001049; Source: Nokia, Nokia Shanghai Bell; Title: Remaining issues on TSC scheduling; Online, Feb. 24-Mar. 6, 2020 (Year: 2020).*

(Continued)

*Primary Examiner* — Mohammed S Chowdhury
(74) *Attorney, Agent, or Firm* — Foley & Lardner LLP

(57) ABSTRACT

Presented are systems, methods, apparatuses, or computer-readable media for allocating configuration grant resources across multiple base stations. A wireless communication device may obtain, rom a first wireless communication node, a plurality of configured grant (CG) configurations. Each of the plurality of CG configurations may be for data transmission in radio resource control (RRC) inactive state in a respective cell. The wireless communication device in the RRC inactive stat may use a first CG configuration from the plurality of CG configurations, to transmit data according to an identifier of a cell in which the wireless communication device camps.

18 Claims, 7 Drawing Sheets

(56) References Cited

U.S. PATENT DOCUMENTS

| | | | | |
|---|---|---|---|---|
| 2023/0030443 | A1* | 2/2023 | Chen | H04W 74/0833 |
| 2023/0102937 | A1* | 3/2023 | Kim | H04W 76/27 |
| | | | | 370/329 |
| 2023/0141487 | A1* | 5/2023 | Chin | H04W 52/0235 |
| | | | | 370/328 |

FOREIGN PATENT DOCUMENTS

| | | | |
|---|---|---|---|
| CN | 110557806 | A | 12/2019 |
| CN | 110691421 | A | 1/2020 |
| CN | 111052657 | A | 4/2020 |
| EP | 3 522 647 | A1 | 8/2019 |
| WO | WO-2020/131373 | A1 | 6/2020 |
| WO | WO-2020/148483 | A1 | 7/2020 |

OTHER PUBLICATIONS

3GPP TSG-RAN WG2 #112e; R2-2009192; Source: ZTE Corporation, Sanechips; Title: Configured grant based small data transmission; eMeeting, Nov. 2-13, 2019 (Year: 2019).*
International Search Report and Written Opinion for PCT Appl. No. PCT/CN2020/106565, mailed Apr. 25, 2021 (9 pages).
Nokia et al.: "Remaining issues on TSC scheduling" 3GPP TSG-RAN WG2 Meeting #109-e; R2- 2001049; Mar. 6, 2020; Online (7 pages).
ZTE Corporation et al.: "Consideration on Multiple CG Supporting in NR-U" 3GPP TSG-RAN2 Meeting 110 electronic; R2-2004615; Jun. 12, 2020; Online (4 pages).
First Office Action for CN Appl. No. 202080104450.9, dated Jul. 15, 2024 (with English translation, 15 pages).
ZTE Corporation (email discussion moderator), "Summary of small data enhancements for NR Rel-17—Phase 2", 3GPP TSG-RAN Meeting #86, RP-192574, Dec. 12, 2019, Sitges, Spain (37 pages).
Third Office Action for CN Appl. No. 202080104450.9, dated May 31, 2025 (with English translation, 16 pages).

* cited by examiner

ALLOCATING CONFIGURATION GRANT RESOURCES ACROSS MULTIPLE BASE STATIONS

CROSS-REFERENCE TO RELATED APPLICATION

This application claims the benefit of priority under 35 U.S.C. § 120 as a continuation of PCT Patent Application No. PCT/CN2020/106565, filed on Aug. 3, 2020, the disclosure of which is incorporated herein by reference in its entirety.

TECHNICAL FIELD

The disclosure relates generally to wireless communications, including but not limited to systems and methods for allocating configuration grant (CG) resources across multiple base stations.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication device may obtain, rom a first wireless communication node, a plurality of configured grant (CG) configurations. Each of the plurality of CG configurations may be for data transmission in radio resource control (RRC) inactive state in a respective cell. The wireless communication device in the RRC inactive stat may use a first CG configuration from the plurality of CG configurations, to transmit data according to an identifier of a cell in which the wireless communication device camps.

In some embodiments, the wireless communication device when in RRC inactive state may obtain the plurality of CG configurations via a broadcast from the first wireless communication node.

In some embodiments, the wireless communication device may select the first CG configuration from the from the plurality of CG configurations, according to a random selection, an index pre-allocated by the first wireless communication node when the wireless communication device is in RRC active state, or an identifier of the wireless communication device.

In some embodiments, the wireless communication device in RRC connected state, from the first wireless communication node, may receive an index of the plurality of CG configuration. In some embodiments, the wireless communication device may send to the first wireless communication node, a confirmation in response to the index. In some embodiments, the wireless communication device may obtain the plurality of CG configurations, via RRC signaling from the wireless communication node.

In some embodiments, the first wireless communication node may receive from a second wireless communication node, at least one CG configuration each configured for each cell of the second wireless communication node. In some embodiments, the first wireless communication node may receive the at least one CG configuration from a second wireless communication node via an Xn interface.

In some embodiments, the wireless communication device may receive, from the first wireless communication node, a first CG configuration configured for a first cell of the second wireless communication node. The first CG configuration may include an identifier of the first cell.

In some embodiments, the wireless communication device may receive, from the first wireless communication node, at least one of: an index for at least one CG configuration for data transmission per cell, or an index for at least one CG configuration configured for the wireless communication device for data transmission when in the RRC inactive state.

In some embodiments, the wireless communication device when in RRC inactive state may select a cell with a higher priority than other cells in a list of cells, to camp on using CG.

At least one aspect is directed to a system, a method, an apparatus, or a computer-readable medium. A first wireless communication node may provide, to a wireless communication device, a plurality of configured grant (CG) configurations, each of the plurality of CG configurations for data transmission in radio resource control (RRC) inactive state in a respective cell. The wireless communication device in the RRC inactive state may be caused to use a first CG configuration from the plurality of CG configurations, to transmit data according to an identifier of a cell in which the wireless communication device camps.

In some embodiments, the first wireless communication node may provide the plurality of CG configurations via a broadcast from the first wireless communication device when in RRC inactive state.

In some embodiments, the wireless communication device may be caused to select the first CG configuration from the from the plurality of CG configurations, according to a random selection, an index pre-allocated by the first wireless communication node when the wireless communication device is in RRC active state, or an identifier of the wireless communication device.

In some embodiments, the first wireless communication node may send, to the wireless communication device in RRC connected state, an index of the plurality of CG configuration. In some embodiments, the first wireless communication node may receive, from the wireless communication device, a confirmation in response to the index. In some embodiments, the first communication node may provide the plurality of CG configurations, via RRC signaling to the wireless communication device.

In some embodiments, the first wireless communication node may receive, from a second wireless communication node, at least one CG configuration each configured for each cell of the second wireless communication node. In some embodiments, the first wireless communication node may receive the at least one CG configuration from a second wireless communication node via an Xn interface.

In some embodiments, the first wireless communication node may send, to the wireless communication device, at least one of: an index for at least one CG configuration for data transmission per cell, or an index for at least one CG configuration configured for the wireless communication device for data transmission when in the RRC inactive state.

In some embodiments, the wireless communication device when in RRC inactive state may be caused to select a cell with a higher priority than other cells in a list of cells, to camp on using CG.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
|---------|-----------|
| 3GPP | 3rd Generation Partnership Project |
| 5G | 5th Generation Mobile Networks |
| 5G-AN | 5G Access Network |
| 5G gNB | Next Generation NodeB |
| CG | Configured Grant |
| CN | Core Network |
| CSI-RS | Channel State Information, Reference Signal |
| CU | Centralized Unit |
| DCI | Downlink Control Information |
| DL | Down Link or Downlink |
| DU | Distributed Unit |
| LCID | Logical Channel Identifier |
| MCG | Master Cell Group |
| NCGI | NR Cell Global Identifier |
| NG | Next Generation |
| NW | Network |
| OFDM | Orthogonal Frequency-Division Multiplexing |
| OFDMA | Orthogonal Frequency-Division Multiple Access |
| PCI | Physical Cell Identifier |
| PDCCH | Physical Downlink Control Channel |
| PDCP | Packet Data Convergence Protocol |
| PDSCH | Physical Downlink Shared Channel |
| PHY | Physical Layer |
| PUCCH | Physical uplink control channel |
| QoS | Quality of Service |
| RA | Random Access |
| RAN | Random Access Network |
| RNA | RAN Notification Area |
| RB | Resource Bearer |
| RLC | Radio Link Control |
| RNTI | Radio Network Temporary Identifier |
| RRC | Radio Resource Control |
| UE | User Equipment |
| UL | Up Link or Uplink |

1. Mobile Communication Technology and Environment

Figure 1:
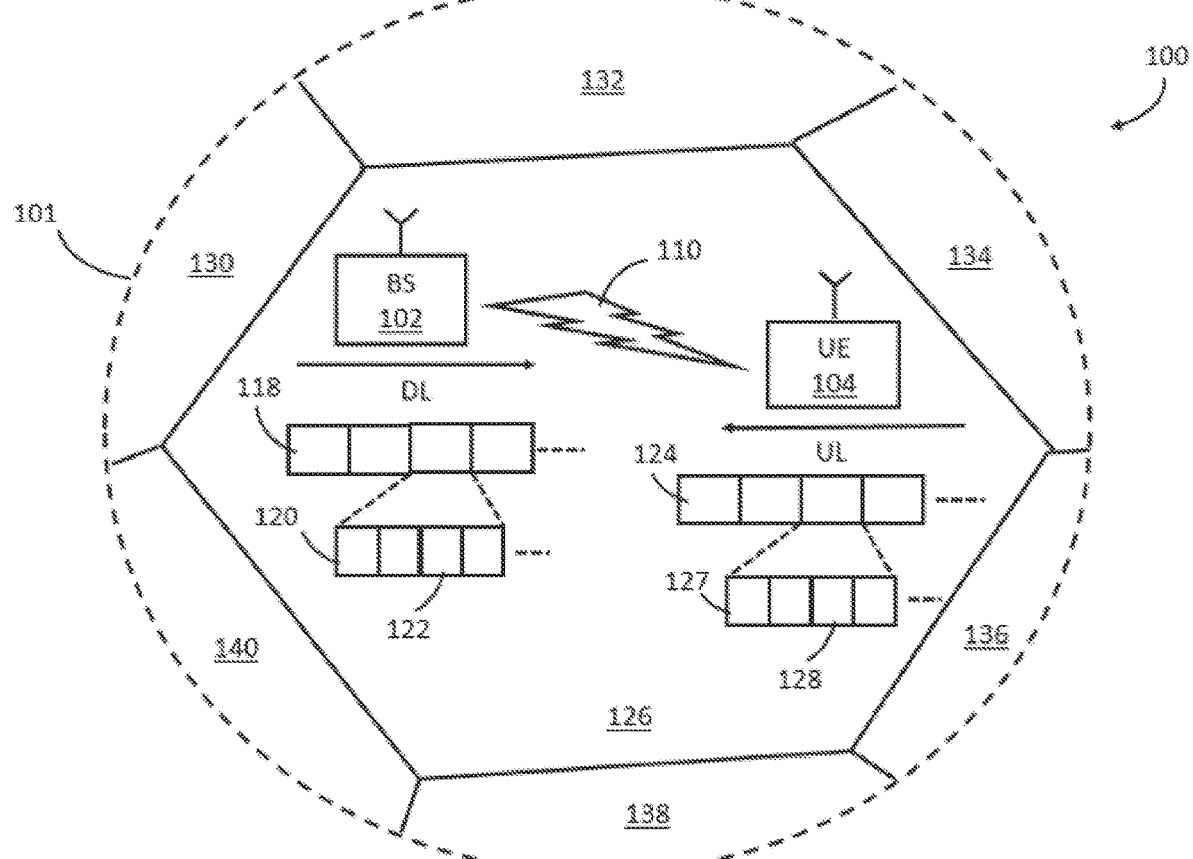
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
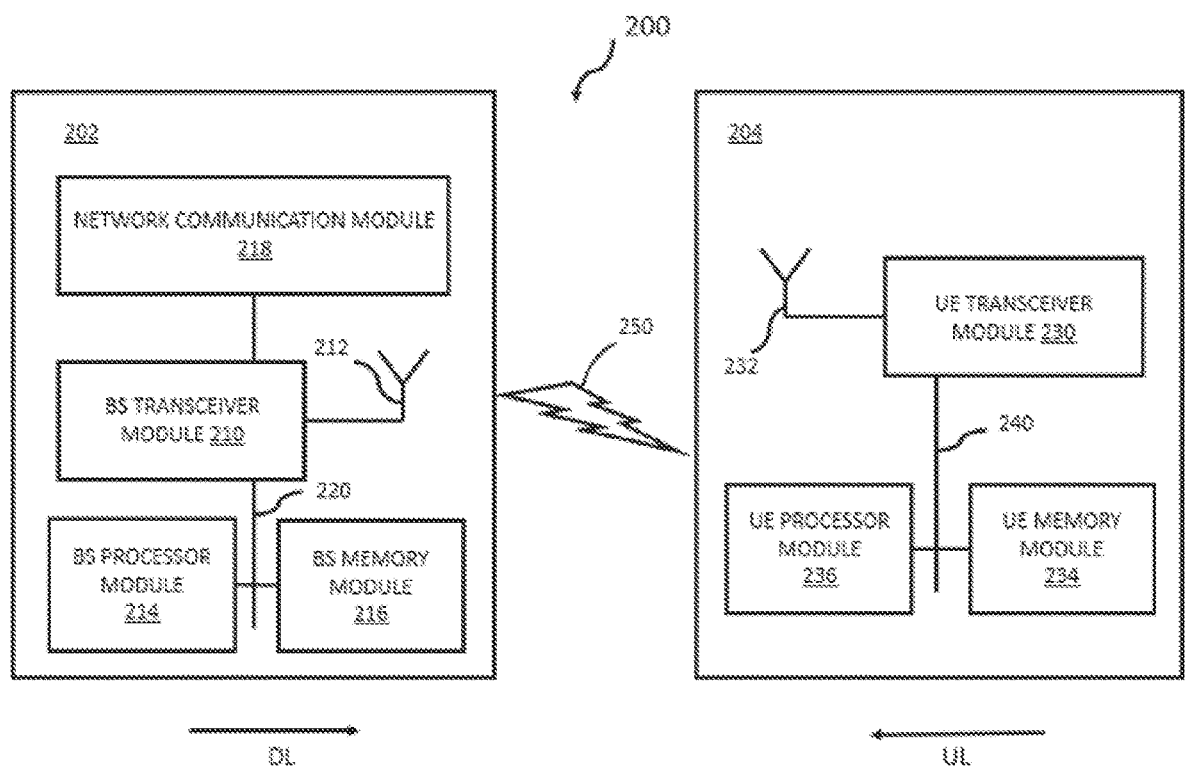
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Allocating Configuration Grant (CG) Resources Across Multiple Base Stations Radio resource control (RRC) inactive state (e.g., RRC_INACTIVE) as defined in 3GPP NR Rel-15) may provide a power efficient state with low control-plane latency. For a UE (e.g., UE 104) in the RRC inactive state, the last serving gNB (e.g., BS 102) may keep the context for the UE and the associated next generation (NG) connections to the core network. In this manner, all resource bearers (RBs) may be recovered quickly after a short random access and RRC resume process on the RAN side. The gNB with the context and the associated NG connections to the core network for a UE in RRC inactive state may referred to as anchor gNB. In a centralized unit (CU) distributed unit (DU) split architecture, the gNB-CU with the context and the associated NG connections to the core network for a UE in RRC inactive state may be referred to as anchor gNB-CU. Furthermore, the gNB-DU with the context and the associated F1 connections to the gNB-CU for a UE in RRC INACTIVE state may be referred to as anchor gNB-DU.

Data transmission without state transition may be not supported for the UE in RRC inactive state (e.g., under In 3GPP NR Rel-15). That is, the UE may enter RRC connected state (e.g., RRC_CONNECTED) first and then initiate the data transmission. To that end, a RRC resume process with considerable signaling consumption may be performed at first, even when the UE only has small data to transmit. Hence, data transmission without state transition for UE in the RRC inactive state may cause high signaling overhead and large data transmission delay.

To solve these and other problems, small data transmission for UE in the RRC inactive state may be leveraged (e.g., as defined in 3GPP Rel-17). The UE in the RRC inactive state may send one or more small data during the random access process. In addition, the UE in the RRC inactive state may send one or more small data in accordance with a configured grant (CG). The CG may be configured before the UE enters the RRC inactive state. Under this approach, the small data may be sent to an access point, which could be a gNB or gNB-DU in a 5G network, through an air interface.

Of particular note may be scenarios concerning CG-based small data transmission where a UE in the RRC inactive state communicates with an access point by using CG resource. Due to the RRC inactive state, as UE moves from cells of one gNB to cells of another gNB in RNA, CG resources in cells from different gNBs may be allocated in advance to the UE. Otherwise, the UE may resort to falling back to random access (RA) based small data solution, and send small data during the random access process. However, the CG configuration method may be used for a UE in the RRC connected state in a serving cell, and may not support CG resources allocation across multiple gNBs for a UE in the inactive state. To overcome this problem, inter-gNB CG configuration for UEs in the RRC inactive state may be performed as detailed herein below.

A. Dedicated CG Configurations of Multiple Cells

In some embodiments, to obtain the information of CG configuration, gNBs may communicate with each other through Xn interface to exchange CG configuration information. Furthermore, a CG configuration request may be sent from one anchor gNB to another peer gNB through Xn interface. The request may contain at least one of: QoS requirement on the CG configuration or a required size of resource block, among others. Upon peer gNB receiving a CG configuration request, the peer gNB may allocate a CG and send the corresponding CG configuration response to the anchor gNB through Xn interface. The CG configuration response could contain at least one of: the CG configuration, cell radio network temporary identifier (C-RNTI) of UE in the peer gNB, and other PHY-layer and MAC-layer configurations (e.g. sounding reference signal (SRS) configuration, PUCCH configuration, channel state information reference signal (CSI-RS) configuration), among others. The CG configuration may be contained in a RRC message container in the CG configuration response.

After gNB obtains the CG configurations from other (peer) gNBs, the recipient gNB may send the CG configurations to UE by RRC signaling before the UE enters into the RRC inactive state. Since CG configuration sent to a UE may belong to a different cells or a different gNB, a cell ID may be used in the CG configuration to show which cell the CG belongs to. Furthermore, an associated C-RNTI for UE may be allocated by the gNB. The gNB may configure the inter-gNB CG configuration. The inter-gNB CG configuration(s) may contain at least one of: one or more lists of CG configurations, associated cell IDs (e.g., NR Cell Global Identifier (NCGI), cell identity, or Physical Cell Identifier (PCI)), the C-RNTI of the UE allocated by the peer gNB, and the other PHY-layer and MAC-layer configuration (e.g., SRS configuration, PUCCH configuration, and CSI-RS configuration). Each of the inter gNB CG configurations may be configured by the peer gNB in one of its cells.

A new list of CG configurations to differentiate CG configurations allocated for small-data transmission in RRC inactive state per cell may be sent to UE. The list of CG configurations for the RRC inactive state may be different from the CG list in RRC connected state. Furthermore, a new CG configuration index may be defined to differentiate CG configurations allocated for small-data transmission in RRC inactive state per UE. In this fashion, a UE may have multiple CG configurations of different cells.

After UE enters the RRC inactive state, UE may use the dedicated CG configurations for small data transmission. Furthermore, UE in the RRC inactive state may select the cells with CG configuration with higher priority than the cells without CG configuration from multiple cells to select for camping.

Figure 3:
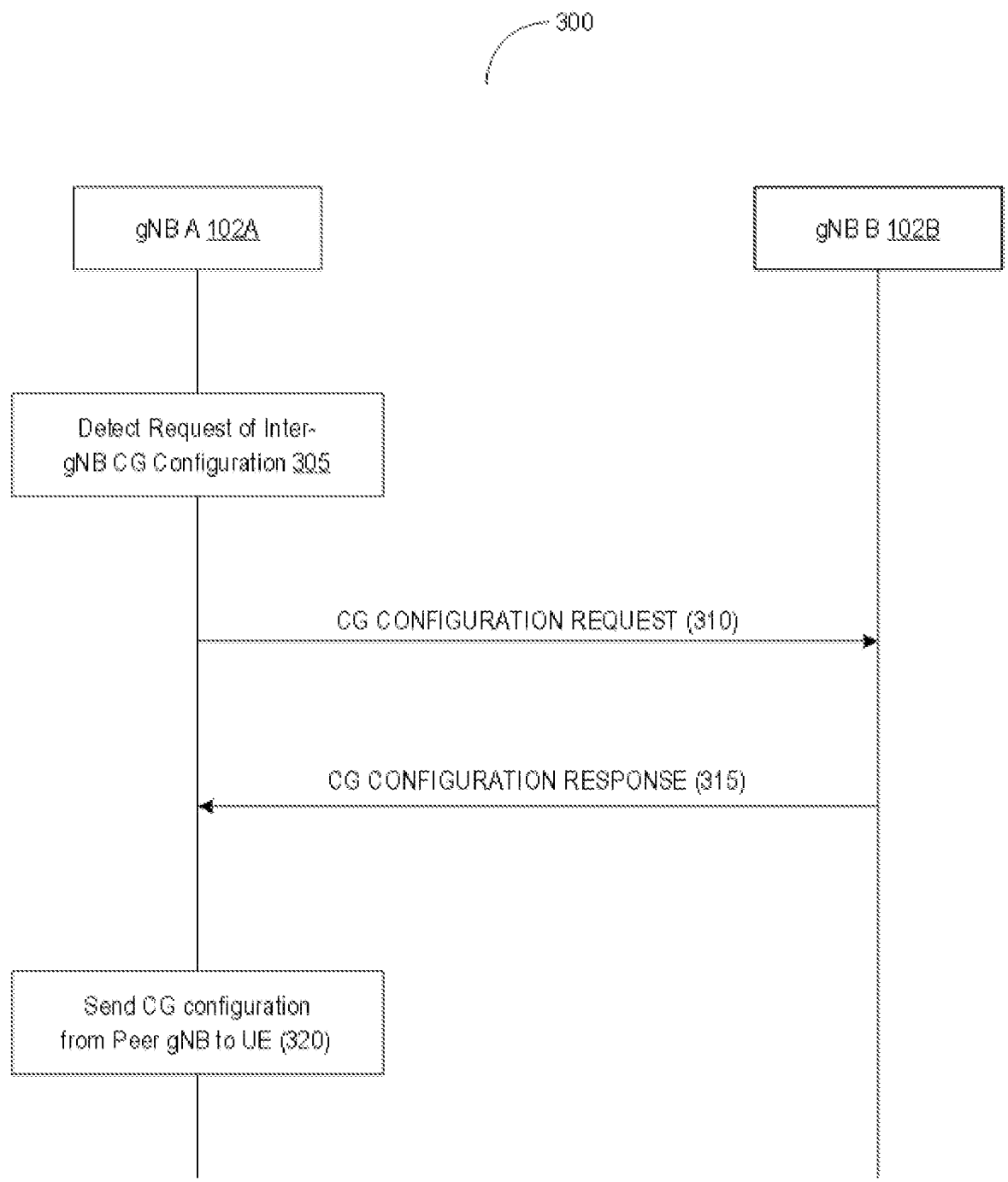
FIG. 3 illustrates a sequence diagram of a system for allocating configuration grant (CG) resources across multiple base stations in accordance with an illustrative embodiment.

Referring now to FIG. 3, depicted is a sequence diagram of a procedure 300 for a system 100 (e.g., as depicted) or 200 to allocate configuration grant (CG) resources across multiple base stations. As illustrated, a gNB A 102A may detect a request of inter-gNB CG configuration for a UE 104 (305). Upon detection, the gNB A 102A will send a CG configuration request to a peer gNB, gNB B 102B (310). The gNB A 102A may be a gNB or anchor gNB serving a UE 104 that is to transition from the RRC connected mode into the RRC inactive state. The request of inter-gNB CG configuration may be sent via Xn interface. The request for inter-gNB CG configuration may include one or more of: quality of service (QoS) requirement on the CG configuration and required size of resource block, among others.

Upon receipt of a CG configuration request, the gNB B 102B may allocate a CG and send the corresponding CG configuration response to the anchor gNB 102A via Xn interface (315). The CG configuration response may include one or more of: one or more lists of CG configurations; associated cell IDs (e.g., NR Cell Global Identifier (NCGI), cell identity, or Physical Cell Identifier (PCI)); C-RNTI of UE 104 assigned by the peer gNB 102B; and Other PHY-layer and MAC-layer configurations (e.g., SRS configuration, PUCCH configuration, CSI-RS configuration), among others. Each of the lists of CG configurations may be configured by the peer gNB 102B in one of its cells. In some embodiments, the CG configuration may be included in a RRC message container in the CG configuration response. The gNB A 102A may send the CG configurations from peer gNB B 102B to the UE 104 via RRC signaling (320).

Figure 4:
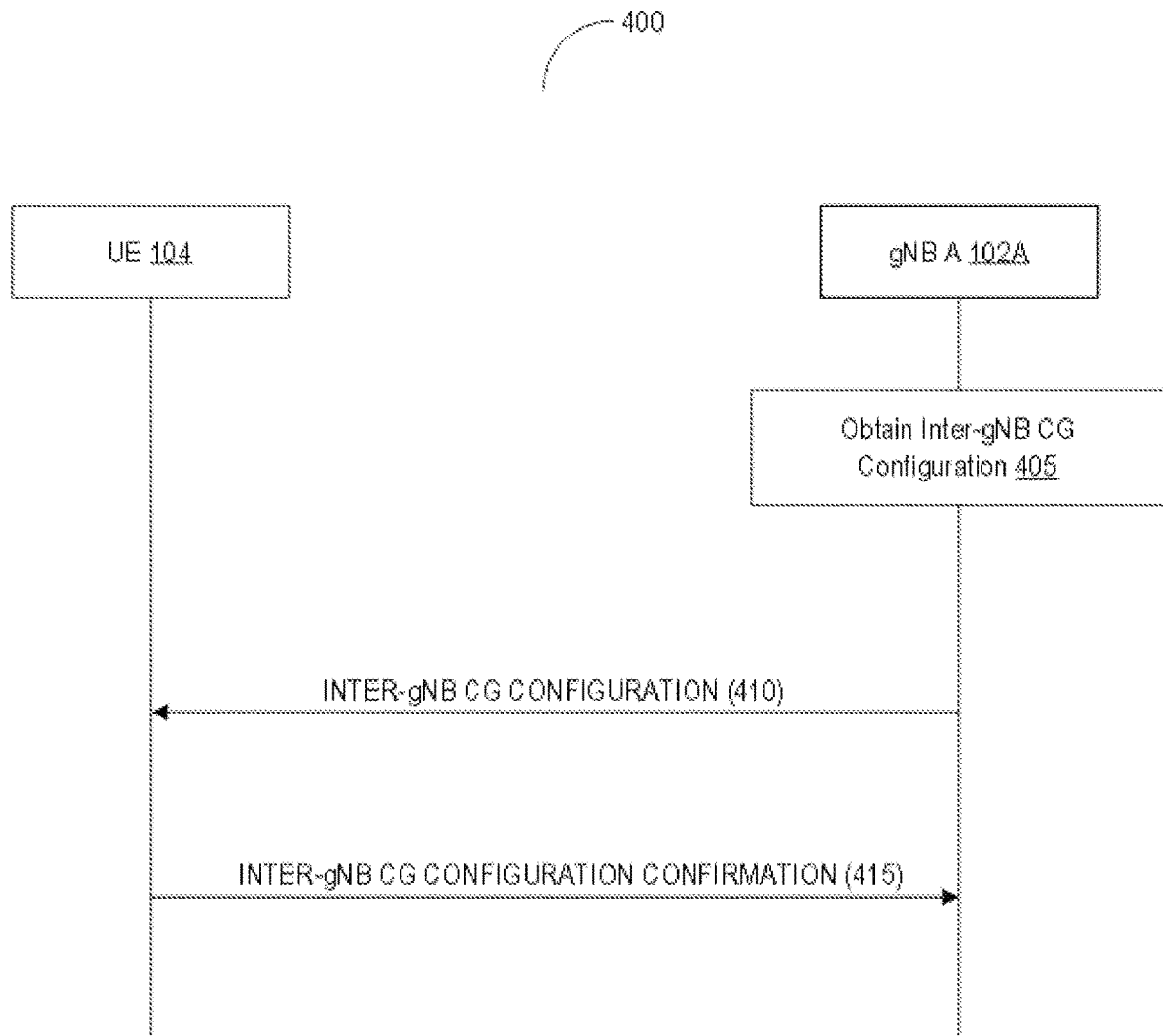
FIG. 4 illustrates a sequence diagram of a procedure for a system to configure wireless communication devices in radio resource control (RRC) inactive state using a configuration grant (CG) in accordance with an illustrative embodiment.

Referring now to FIG. 4, depicted is a sequence diagram of a procedure 400 for a system 100 (e.g., as depicted) or 200 to configure wireless communication devices in radio resource control (RRC) inactive state using a configuration grant (CG). The information exchange in inter-gNB CG configuration procedures may occur when the UE 104 is in RRC connected state. The inter-gNB CG configuration may be used when UE 104 enters into the RRC inactive state, and moves into the coverage of the corresponding gNB. For example, the UE 104 may enters into the cell of the gNB B 102B, and may use the inter-gNB CG configuration that is initially configured by gNB B 102B.

As illustrated, the gNB A 102A may obtain the inter-gNB CG configuration from one or more other gNBs (e.g., gNB B 102B) (405). The gNB 102A may send the inter-gNB CG configuration(s) to UE 104 (410). The inter-gNB CG configuration(s) may be sent via RRC signaling. The inter-gNB CG configuration(s) may include one or more of: one or more lists of CG configurations, associated cell IDs (e.g., NR Cell Global Identifier (NCGI), cell identity, or Physical Cell Identifier (PCI)), the C-RNTI of the UE allocated by the peer gNB, and the other PHY-layer and MAC-layer configuration (e.g., SRS configuration, PUCCH configuration, and CSI-RS configuration). Each of the inter gNB CG configurations may be configured by the peer gNB in one of its cells. Furthermore, one or more separate lists of CG configurations for small-data transmission in the RRC inactive state may be sent to UE. The CG configurations for small data transmissions in the RRC inactive state may be different from the CG list used in the RRC connected state.

In addition, a new CG configuration index may be defined to differentiate CG configurations allocated for small-data transmission in RRC inactive state per cell. The index may be referred to as ConfiguredGrantConfigInactiveIndex. A new CG configuration index may be defined to differentiate CG configurations allocated for small-data transmission in the RRC inactive state per UE 104. This index may be referred to as ConfiguredGrantConfigInactiveIndexUE.

Upon receipt of the configuration, the UE 104 may apply the configuration and send an inter gNB CG configuration confirmation back to the gNB A 102A (415). After UE 104 enters the RRC inactive state, UE 104 may use the received CG configurations for small data transmission. The UE 104 may select a CG configurations according to the cell ID of the cell the UE is to camp on. Furthermore, UE 104 in the RRC inactive state may select the cells with CG configuration with higher priority than the cells without CG configuration when there are multiple cells to select for camping.

B. Common CG Configurations Per Individual Cell

In some embodiments, before UE 104 enters the RRC inactive state, the UE 104 may be allocated a CG index by the gNB. The gNB may broadcast a list of common CG configurations for UEs in the RRC inactive state. Each of the configurations may contain a CG index. After UE 104 enters the RRC inactive state, the UE 104 may receive the gNB's broadcasting and acquire the common CG configuration. When small data arrives, the UE 104 may select a common CG for the transmission of the small data. One of common CGs may be selected in the following method: using a pseudo-random number generator (e.g., randomly), based on the CG index allocated by gNB in advance, or based on the ID of the UE 104 (e.g., inactive RNTI (I-RNTI)), among others. The UE 104 in the RRC inactive state may use the selected common CG configuration to transmit the small data.

Figure 5:
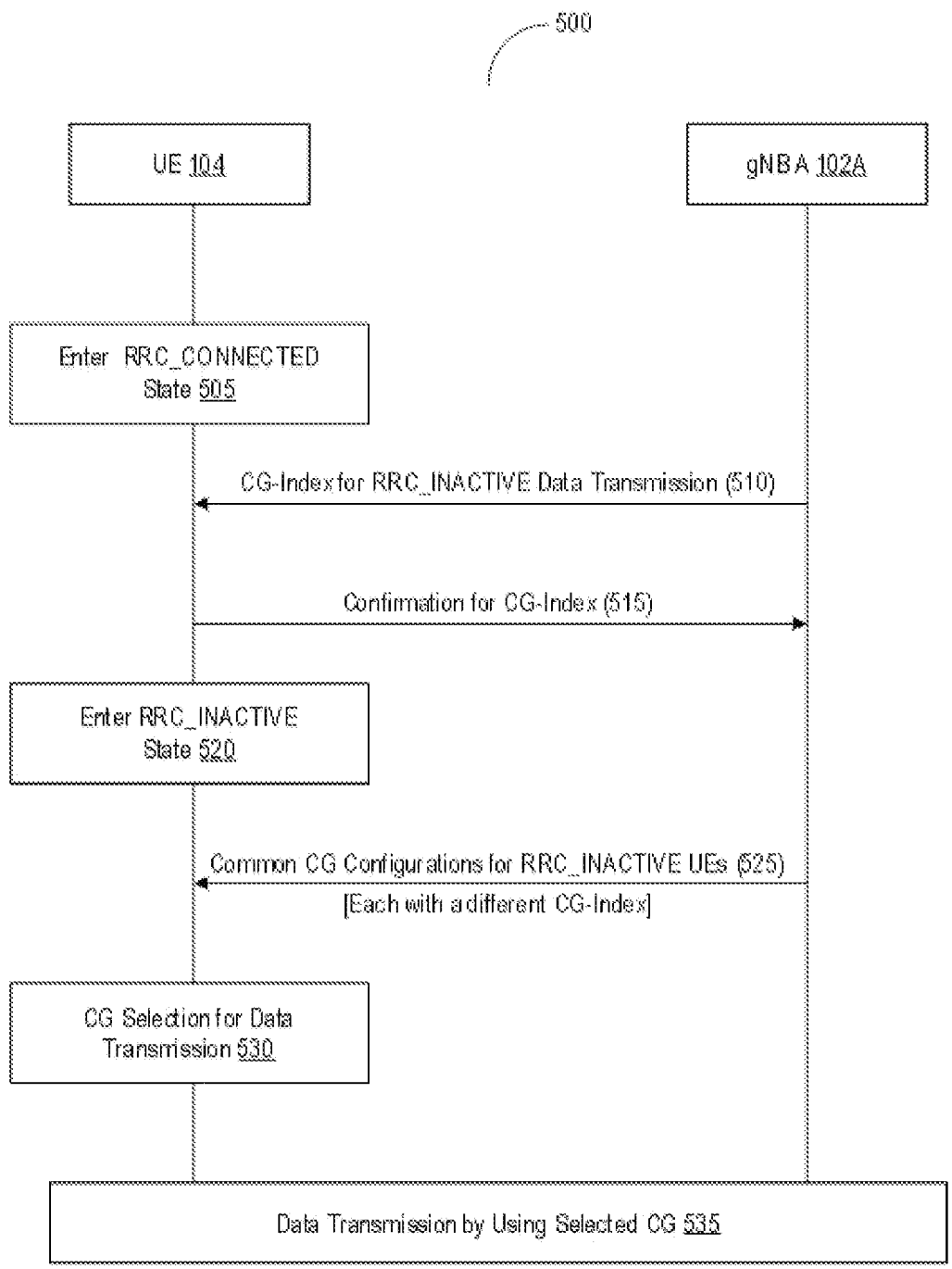
FIG. 5 illustrates a sequence diagram of a procedure for a system to configure wireless communication devices transitioning from a radio resource control (RRC) connected state to a RRC inactive state using a configuration grant (CG) in accordance with an illustrative embodiment.

Referring now to FIG. 5, depicted is a sequence diagram of a procedure 500 for a system 100 (e.g., as depicted) or 200 to configure wireless communication devices transitioning from a radio resource control (RRC) connected state to a RRC inactive state using a configuration grant (CG). The UE 104 may enter the RRC connected state (505). The gNB A 102A may notify an CG index to the UE 104 for future small data transmission during RRC inactive state (510). In turn, UE 104 may send a confirmation for the reception of the CG index (515).

The UE 104 may subsequently enter the RRC inactive state (520). When in the RRC inactive state, the UE 104 may receive information (e.g., in a system information block (SIB)) from the gNB 102A in the camping cell via broadcast (520). The information may include common CG configurations allocated for small data transmissions of all UEs in the RRC inactive state in the cell. The UE 104 may read the common CG configurations.

Upon receipt small data, the UE 104 in the RRC inactive state may select a common CG for small data transmission (530). One of common CGs may be selected using one or more of the following methods: randomly (e.g., using a pseudo-random number generator), based on the CG index allocated by the gNB 102A in advance, or based on the ID for the UE when in RRC inactive state, among others. The ID for the UE may include, for example, I-RNTI. The UE may use I-RNTI to modulo a value to identify the specific common CG. The UE 104 in the RRC inactive state may use the selected common CG configuration to transmit the small data (535).

C. Triggering of Resume Procedure

Figure 6:
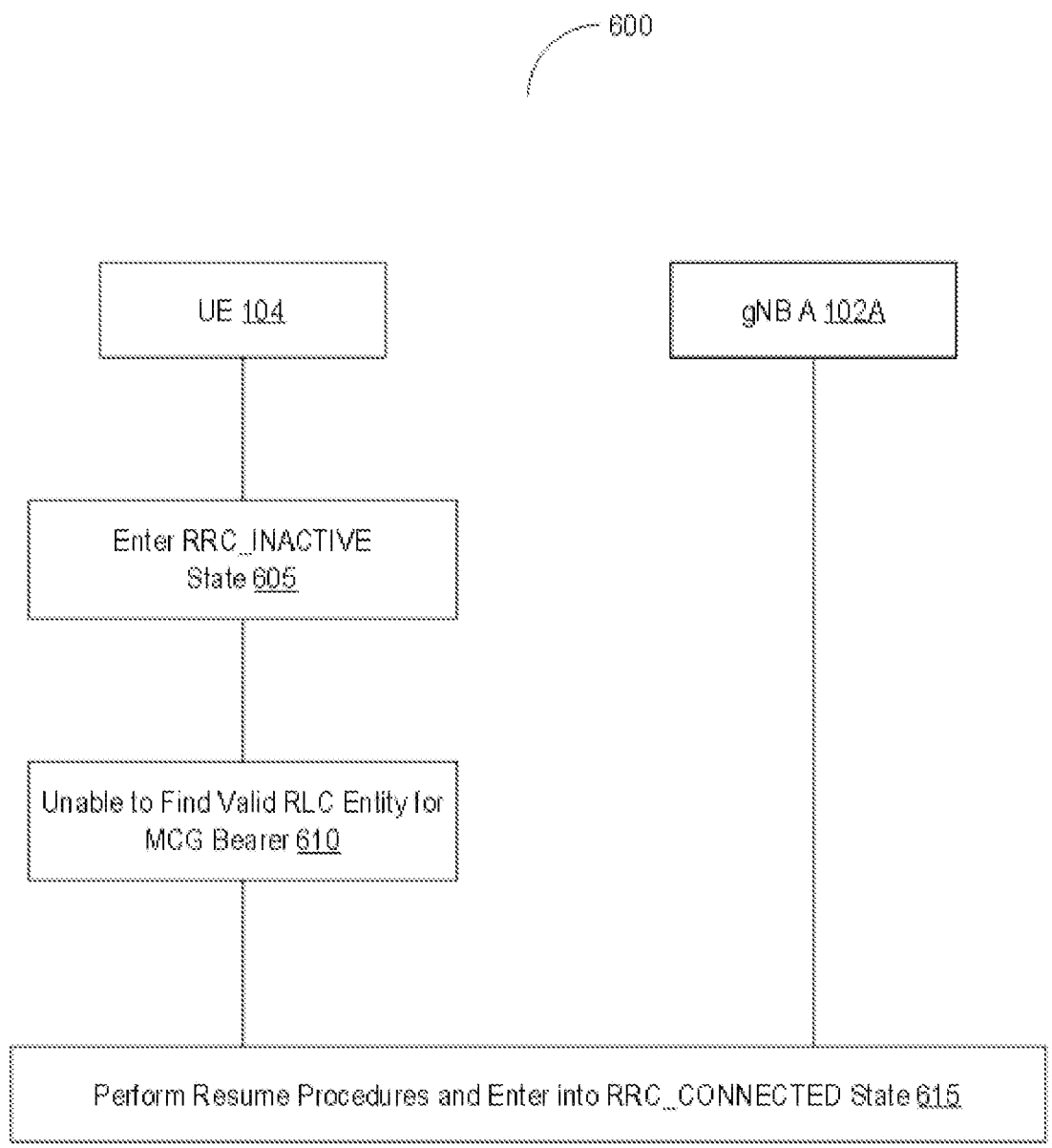
FIG. 6 illustrates a sequence diagram of a system for triggering resume process for wireless communication devices in a radio resource control (RRC) inactive state in accordance with an illustrative embodiment.

Referring now to FIG. 6, depicted is a sequence diagram of a procedure 600 for a system to trigger resume process for wireless communication devices in a radio resource control (RRC) inactive state. In some embodiments, when small data arrives at UE 104 in the RRC inactive state, the UE 104 may trigger resume procedures when unable to find a valid radio link control (RLC) entity of a master cell group (MCP) bearer. As illustrated, the UE 104 may enter the RRC inactive state (605). When small data arrive at the UE 104, the UE 104 may attempt to identify a valid RLC entity for the MCG bearer. The UE 104 may be unable to find any valid RLC entity for MCG bearer (610). In response to the determination, the 104 in the RRC inactive state may trigger legacy resume procedures and enter into the RRC connected state (615).

D. Allocating Configuration Grant Resources Across Multiple Base Stations

Figure 7:
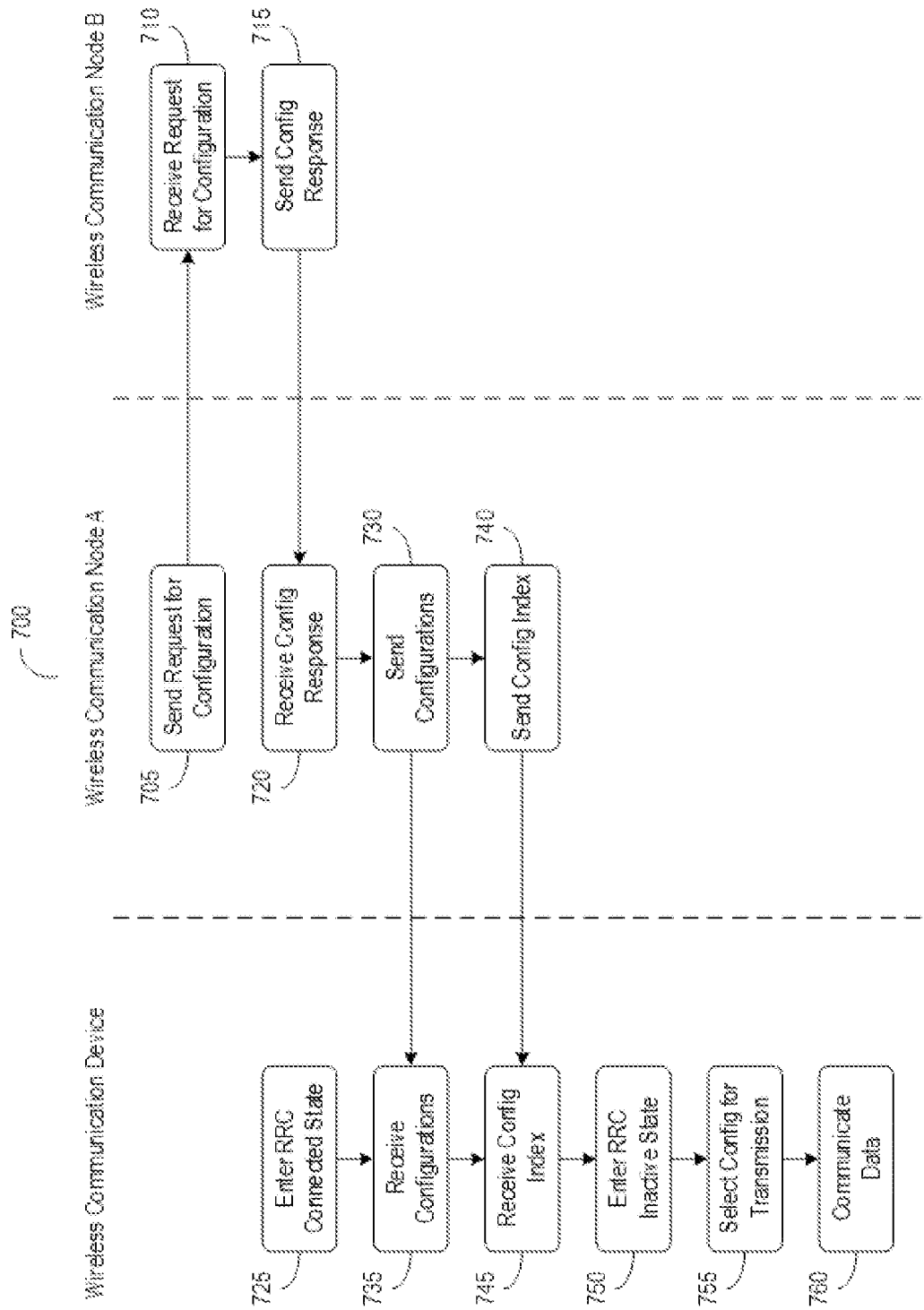
FIG. 7 illustrates a functional band diagram of an example method of allocating configuration grant resources across multiple base stations in accordance with an illustrative embodiment.

FIG. 7 illustrates a functional band diagram of a method 700 of allocating configuration grant resources across multiple base stations. The method 700 may be performed by or implemented using the components detailed herein in conjunction with FIGS. 1-6. In brief overview, a first wireless communication node may send a request for configuration (705). The second wireless communication node may receive the request for configuration (710). A second wireless communication node may send a configuration response (715). The first wireless communication node may receive the configuration response (720). A wireless communication device may enter a radio resource control (RRC) connected state (725). The first wireless communication node may send a set of configurations (730). The wireless communication device may receive the set of configurations (735). The first wireless communication node may send a configuration index (740). The wireless communication device may receive the configuration index (745). The wireless communication device may enter a RRC inactive state (750). The wireless communication device may select the configuration for transmission (755). The wireless communication device may communication data (760).

In further detail, a first wireless communication node (e.g., gNB A 102A) may provide, transmit, or otherwise send a request for configuration grant (CG) configuration to a second wireless communication node (e.g., gNB 102B) (705). In some embodiments, the first wireless communication node may generate the request for CG configuration. The request may identify or specify one or more parameters for the CG for data transmissions by one or more wireless communication devices (e.g., UE 104) each in a radio resource control (RRC) inactive state. The parameter may include, for example, a quality of service (QoS) requirement on the CG configuration or a required size of a resource block, among others. In some embodiments, the first wireless communication node may send the request via an air interface (e.g., Xn interface).

The second wireless communication node may retrieve, identify, or otherwise receive the request for CG configuration from the first wireless communication node (710). In some embodiments, the second wireless communication node may receive the request via the air interface. Upon receipt of the request, the second wireless communication may allocate, identify, or otherwise determine a set of CG configurations to send to the first wireless communication node. Each CG configuration may define, identify, or otherwise specify one or more resources for data transmissions by the one or more wireless communication devices (e.g., UE 104) each in a radio resource control (RRC) inactive state in a respective cell (e.g., the cell 126, 130, 132, 134, 136, 138 and 140). In some embodiments, each CG configuration may be configured for each cell of the first wireless communication node or the second wireless communication node. In some embodiments, each CG configuration may be configured for each UE in communication with the first wireless communication node.

The second wireless communication node may provide, transmit, or otherwise send a CG configuration response to the first wireless communication node (715). Upon allocation, the second wireless communication node may generate the CG configuration response. The CG configuration response may identify or include one the set of CG configurations. The set of CG configurations may include parameters for individual wireless communication devices or individual cells. In addition, the CG configuration response may identify or include, for example, a cell radio network temporary identifier (C-RNTI) for each wireless communication device, physical (PHY) layer configuration, and a media access control (MAC) layer configuration (e.g., sounding reference signal (SRS) configuration, PUCCH configuration, and CSI-RS configuration), among others. In some embodiments, the second wireless communication node may transmit the CG configuration response (including the set of CG configurations) to the first wireless communication node via the air interface (e.g., Xn interface).

The first wireless communication node may retrieve, identify, or otherwise receive the CG configuration response from the second wireless communication node (720). In some embodiments, the first wireless communication node may receive each CG configuration configured for each cell of the first wireless communication node or the second wireless communication node. In some embodiments, the first wireless communication node may receive the CG configuration response (including the set of CG configurations) via the air interface (e.g., Xn interface). Upon receipt, the first wireless communication node may parse the CG configuration response to identify the set of CG configurations.

A wireless communication device may enter a radio resource control (RRC) connected state (725). In some embodiments, as the CG configuration is sent from the second wireless communication node to the first wireless communication node, the wireless communication device may be in the RRC connected state (e.g., "RRC_CONNECTED"). Under the RRC connected state, the wireless communication device may communicate with the first wireless communication node via an RRC connection. The wireless communication device may transmit a wide range of data over the RRC connection to the first wireless communication node. In some embodiments, the wireless The first wireless communication node may provide, transmit, or otherwise send the set of CG configurations to the wireless communication device (730). Upon receipt of the CG configuration response, the first wireless communication node may forward or provide the set of CG configurations from the response to the wireless communication device. In some embodiments, the first wireless communication node may provide the set of CG configurations via RRC signaling to the wireless communication device. The wireless communication device to which the set of CG configuration is provided may be in the RRC connected state. The set of CG configurations may be provided to the wireless communication device before transition from the RRC connected state.

The wireless communication device may obtain, identify, or otherwise receive the set of CG configurations from the first wireless communicate node (735). In some embodiments, the wireless communication device may obtain the set of CG configurations via RRC signaling from the first wireless communication node. The set of CG configurations received from the first wireless communication node may be configured for individual wireless communication devices or for individual cells. In some embodiments, a CG configuration of the set may be configured for a cell of the second wireless communication node. The CG configuration may identify or include an identifier (e.g., PCI, NCGI, or other cell identifier) for the cell of the second wireless communication device.

The first wireless communication node may provide, transmit, or otherwise send one or more CG configuration indices to the wireless communication device (740). In some embodiments, the first wireless communication node may allocate, identify, or otherwise assign a CG configuration index for individual wireless communication devices or individual cells. Each CG configuration index may reference or correspond to a CG configuration for a particular wireless communication device or a cell. Upon assignment, the first wireless communication node may send the set of CG configuration indices to the wireless communication device. The wireless communication device to which the set of CG configuration indices is provided may be in the RRC connected state. The set of CG configuration indices may be provided to the wireless communication device before transition from the RRC connected state.

The wireless communication device may obtain, identify, or otherwise receive the one or more CG configuration indices from the first wireless communication node (745). The set of CG configuration indices received from the first wireless communication node may be configured for individual wireless communication devices or for individual cells. In some embodiments, at least one CG index may be for a CG configuration for data transmission per cell. In some embodiments, at least one CG index may be for a CG configuration configured for the wireless communication for data transmission.

The wireless communication device may transition or otherwise enter a RRC inactive state (750). When in the RRC inactive state, the wireless communication device may at least temporarily suspend the communications session with the gNB. The data transmitted by the wireless communication device may correspond to small data (e.g., small packets or payload, such as those below a defined data size). For example, the size of the data may be less than a 100 bytes. The data transmitted by the wireless communication device may also be sporadic. For example, the wireless communication device may send the data once at a rate between 1 minute or greater. In some embodiments, while in the RRC inactive state, the wireless communication device may receive one or more of the information for data transmissions from the first wireless communication node.

In some embodiments, the first wireless communication node may provide, transmit, or otherwise send a set of CG configurations via the broadcast to the first wireless communication node when in the RRC inactive state. In some embodiments, while in the RRC inactive state, the wireless communication device may obtain, identify, or otherwise receive the set of CG configurations via a broadcast from the first wireless communication node. The set of CG configurations broadcast by the first wireless communication node may be a set of common CG configuration for one or more of the wireless communication devices of the cell of the second wireless communication node.

In some embodiments, the first wireless communication node may provide, transmit, or otherwise send at least one CG configuration index to the wireless communication node in the RRC inactive state. In some embodiments, while in the RRC inactive state, the wireless communication device may obtain, identify, or otherwise receive the set of CG configuration indices from the first wireless communication node. Each CG configuration index may correspond to or refer one of the CG configurations in the set. The CG configurations may be common to one or more of the wireless communication devices of the cell. In some embodiments, the wireless communication device may return, transmit, or otherwise send a confirmation in response to receipt of the CG configuration index. The confirmation may be sent to the first wireless communication node, and may be an acknowledge of receipt of the CG index. In turn, the first wireless communication node may retrieve, identify, or receive the confirmation of receipt from the wireless communication device.

The wireless communication device may identify or select the CG configuration for transmission (755). The selection of the CG configuration from the set of CG configurations may be in response to transitioning from the RRC connected state to the RRC inactive state. In some embodiments, when in the RRC inactive state, the wireless communication device may select the CG configuration from the set for data transmission in accordance with a random selection (e.g., using a pseudo-random number generation). In some embodiments, the wireless communication device may select the CG configuration from the set for data transmission in accordance with a CG configuration index allocated by the first wireless communication node. In some embodiments, the wireless communication device may select the CG configuration from the set for data transmission in accordance with an identifier for the wireless communication device (e.g., I-RNTI).

In some embodiments, the wireless communication device may select a cell in accordance to the selected CG configuration. In some embodiments, the wireless communication device may identify or select a cell with a higher priority than other cells in a list of cells to camp on using the CG configuration. The other cells may lack or not correspond to the selected CG configuration. The list of cells may include those for the second wireless communication node. Upon selection of the CG configuration, the wireless communication device may identify the list of cells associated with the CG configuration. With the selection, the wireless communication device may initiate camping on the cell.

The wireless communication device may communicate data (760). Using the CG configuration selected from the set of CG configurations, the wireless communication device may transmit data according to an identifier of the cell in which the wireless communication camps. The identifier of the cell may correspond to or reference the cell identified in accordance with the selected CG configuration. The wireless communication device may continue to be in the RRC inactive state while communication data (e.g., small data) with the cell. In some embodiments, the wireless communication device may initiate or execute a resume procedure to reenter the RRC active state based on whether a valid RLC entity for the MCG bearer is found. When not found, the wireless communication device may execute the resume procedure.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
obtaining, by a wireless communication device from a first wireless communication node, a plurality of sounding reference signal (SRS) configurations, each of the plurality of SRS configurations associated with a cell identifier (ID) of a respective second wireless communication node of a plurality of second wireless communication nodes and a cell radio network temporary identifier (C-RNTI) assigned by the respective second wireless communication node, wherein each of the plurality of SRS configurations is received by the first wireless communication node from the respective second wireless communication node and is for data transmission in radio resource control (RRC) inactive state in a respective cell of the respective second wireless communication node; and
using, by the wireless communication device in response to entering the RRC inactive state, a first SRS configuration from the plurality of SRS configurations, to transmit data according to an identifier of a cell in which the wireless communication device camps.

2. The method of claim 1, comprising:
obtaining, by the wireless communication device when in the RRC inactive state, the plurality of SRS configurations via a broadcast from the first wireless communication node.

3. The method of claim 1, comprising:
selecting, by the wireless communication device, the first SRS configuration from the from the plurality of SRS configurations, according to:
a random selection,
an index pre-allocated by the first wireless communication node when the wireless communication device is in the RRC inactive state, or
an identifier of the wireless communication device.

4. The method of claim 1, comprising:
receiving, by the wireless communication device in the RRC inactive state, from the first wireless communication node, an index of the plurality of SRS configurations; and
sending, by the wireless communication device to the first wireless communication node, a confirmation in response to the index.

5. The method of claim 1, comprising:
obtaining, by the wireless communication device, the plurality of SRS configurations, via RRC signaling from the first wireless communication node.

6. The method of claim 1, wherein the first wireless communication node receives each of the plurality of SRS configurations from the respective second wireless communication node via an Xn interface.

7. The method of claim 1, comprising:
receiving, by the wireless communication device from the first wireless communication node, the first SRS configuration configured for a first cell of the respective second wireless communication node, the first SRS configuration including an identifier of the first cell.

8. The method of claim 1, comprising:
receiving, by the wireless communication device from the first wireless communication node, at least one of: an index for at least one SRS configuration for data transmission per cell, or an index for one SRS configuration configured for the wireless communication device for data transmission when in the RRC inactive state.

9. The method of claim 1, comprising:
selecting, by the wireless communication device when in the RRC inactive state, a cell with a higher priority than other cells in a list of cells, to camp on using SRS configuration.

10. A method, comprising:
providing, by a first wireless communication node to a wireless communication device, a plurality of sounding reference signal (SRS) configurations, each of the plurality of SRS configurations associated with a cell identifier (ID) of a respective second wireless communication node of a plurality of second wireless communication nodes and a cell radio network temporary identifier (C-RNTI) assigned by the respective second wireless communication node, wherein each of the plurality of SRS configurations is received by the first wireless communication node from the respective second wireless communication node and is for data transmission in radio resource control (RRC) inactive state in a respective cell of the respective second wireless communication node,
causing the wireless communication device, in response to entering the RRC inactive state, to use a first SRS configuration from the plurality of SRS configurations, to transmit data according to an identifier of a cell in which the wireless communication device camps.

11. The method of claim 10, comprising
providing, by the first wireless communication node, the plurality of SRS configurations via a broadcast from the first wireless communication device when in the RRC inactive state.

12. The method of claim 10, comprising:
causing the wireless communication device to select the first SRS configuration from the from the plurality of SRS configurations, according to:
a random selection,
an index pre-allocated by the first wireless communication node when the wireless communication device is in the RRC inactive state, or
an identifier of the wireless communication device.

13. The method of claim 10, comprising:
sending, by the first wireless communication node to the wireless communication device in the RRC inactive state, an index of the plurality of SRS configurations; and
receiving, by the first wireless communication node from the wireless communication device, a confirmation in response to the index.

14. The method of claim 10, comprising:
providing, by the first communication node, the plurality of SRS configurations, via RRC signaling to the wireless communication device.

15. The method of claim 10, comprising:
receiving, by the first wireless communication node, each of the plurality of SRS configurations from the respective second wireless communication node via an Xn interface.

16. The method of claim 10, comprising:
sending, by the first wireless communication node to the wireless communication device, the first SRS configuration configured for a first cell of the respective second wireless communication node, the first SRS configuration including an identifier of the first cell.

17. A wireless communication device, comprising:
at least one processor configured to:
  obtain, from a first wireless communication node, a plurality of sounding reference signal (SRS) configurations, each of the plurality of SRS configurations associated with a cell identifier (ID) of a respective second wireless communication node of a plurality of second wireless communication nodes and a cell radio network temporary identifier (C-RNTI) assigned by the respective second wireless communication node, wherein each of the plurality of SRS configurations is received by the first wireless communication node from the respective second wireless communication node and is for data transmission in radio resource control (RRC) inactive state in a respective cell of the respective second wireless communication node; and
  use, in response to entering the RRC inactive state, a first SRS configuration from the plurality of SRS configurations, to transmit data according to an identifier of a cell in which the wireless communication device camps.

18. A first wireless communication node, comprising:
at least one processor configured to:
  provide, to a wireless communication device, a plurality of sounding reference signal (SRS) configurations, each of the plurality of SRS configurations associated with a cell identifier (ID) of a respective second wireless communication node of a plurality of second wireless communication nodes and a cell radio network temporary identifier (C-RNTI) assigned by the respective second wireless communication node, wherein each of the plurality of SRS configurations is received by the first wireless communication node from the respective second wireless communication node and is for data transmission in radio resource control (RRC) inactive state in a respective cell of the respective second wireless communication node,
  causing the wireless communication device, in response to entering the RRC inactive state, to use a first SRS configuration from the plurality of SRS configurations, to transmit data according to an identifier of a cell in which the wireless communication device camps.

* * * * *